Aug. 29, 1961 L. P. KAHN 2,998,195
MULTIPLE ZONE FURNACE CONTROL SYSTEM
Filed Feb. 11, 1957 3 Sheets-Sheet 1
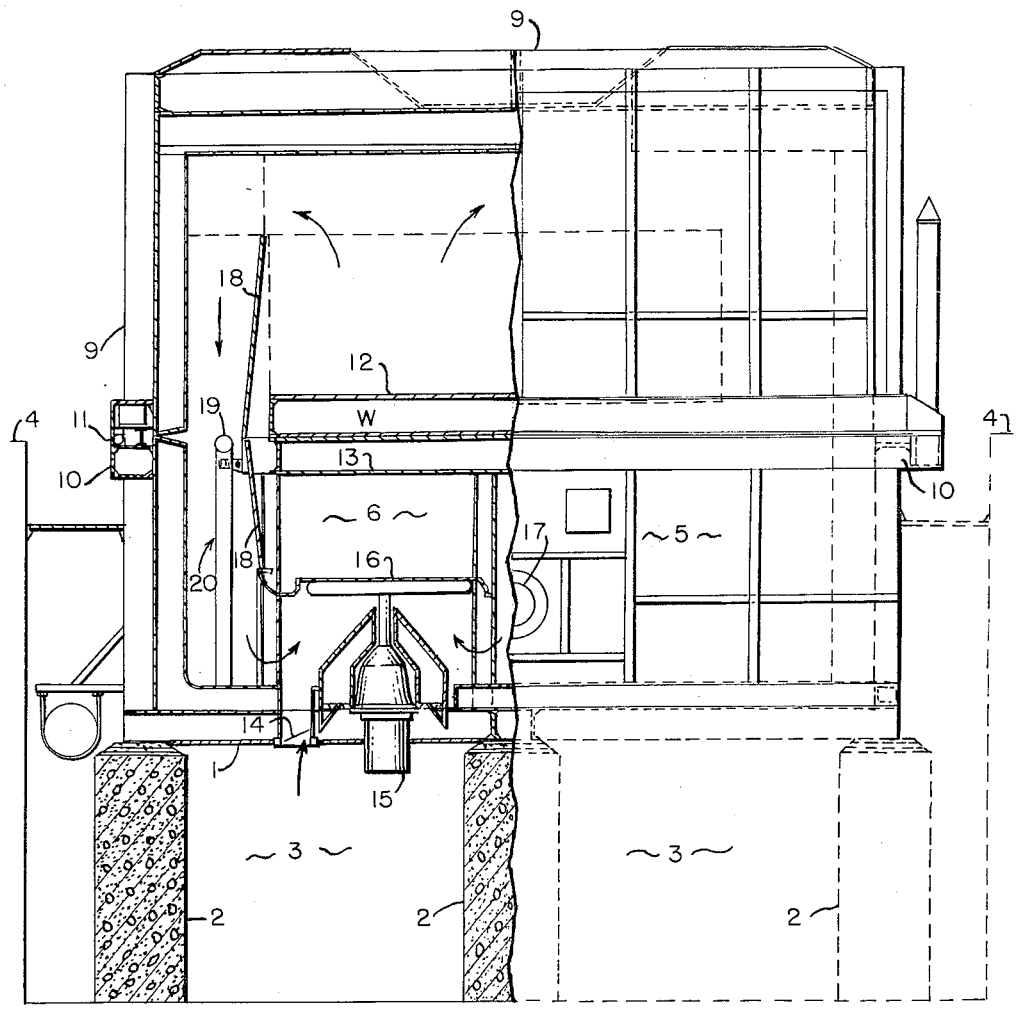
Fig.1
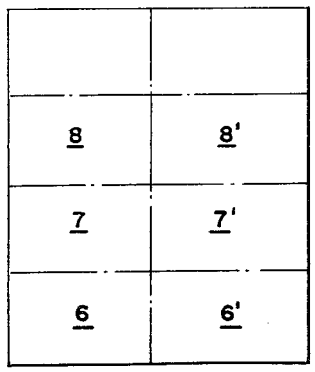
Fig. IV
INVENTOR.
LAWRENCE P. KAHN
BY
Charles S. Haughey
ATTORNEY

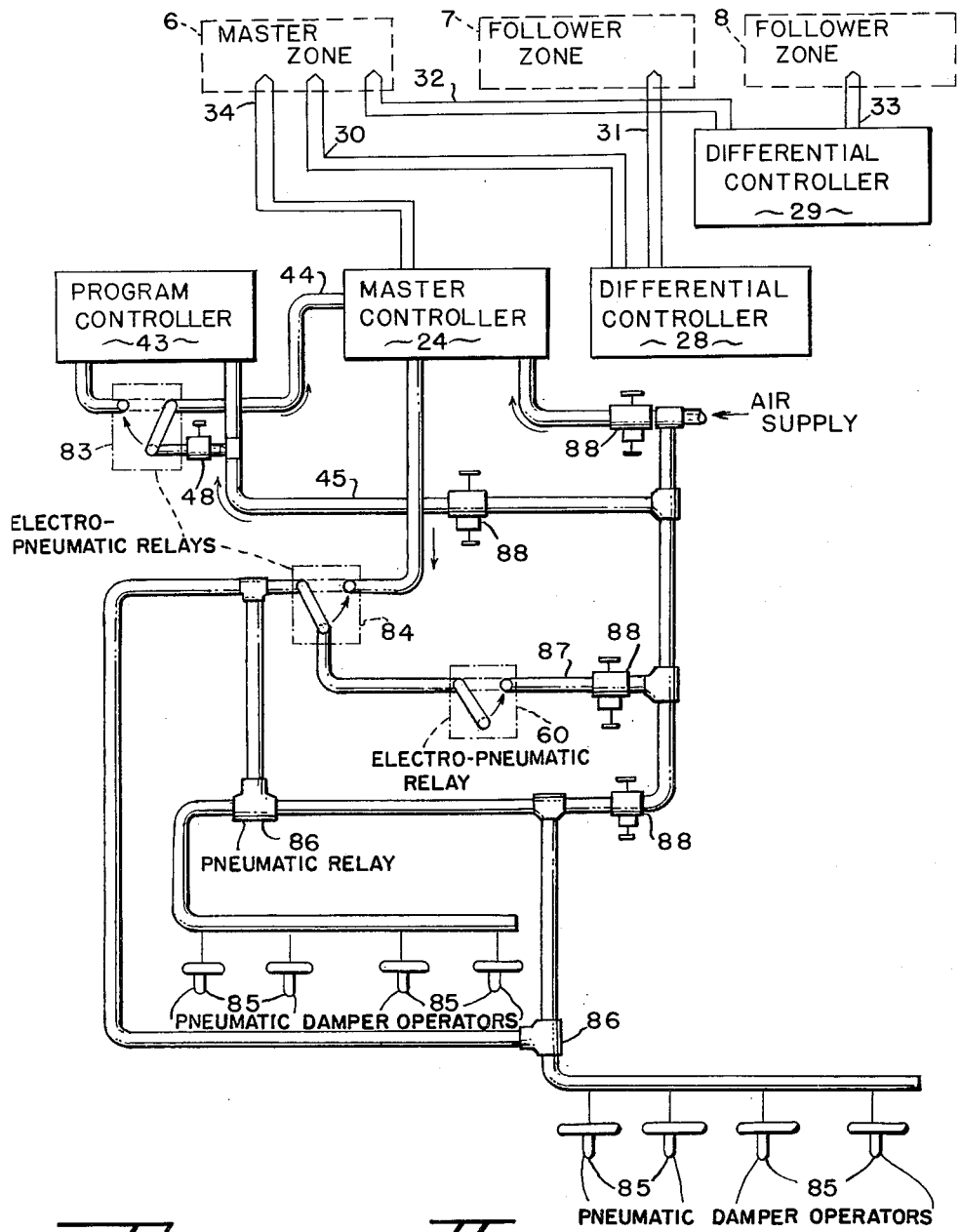

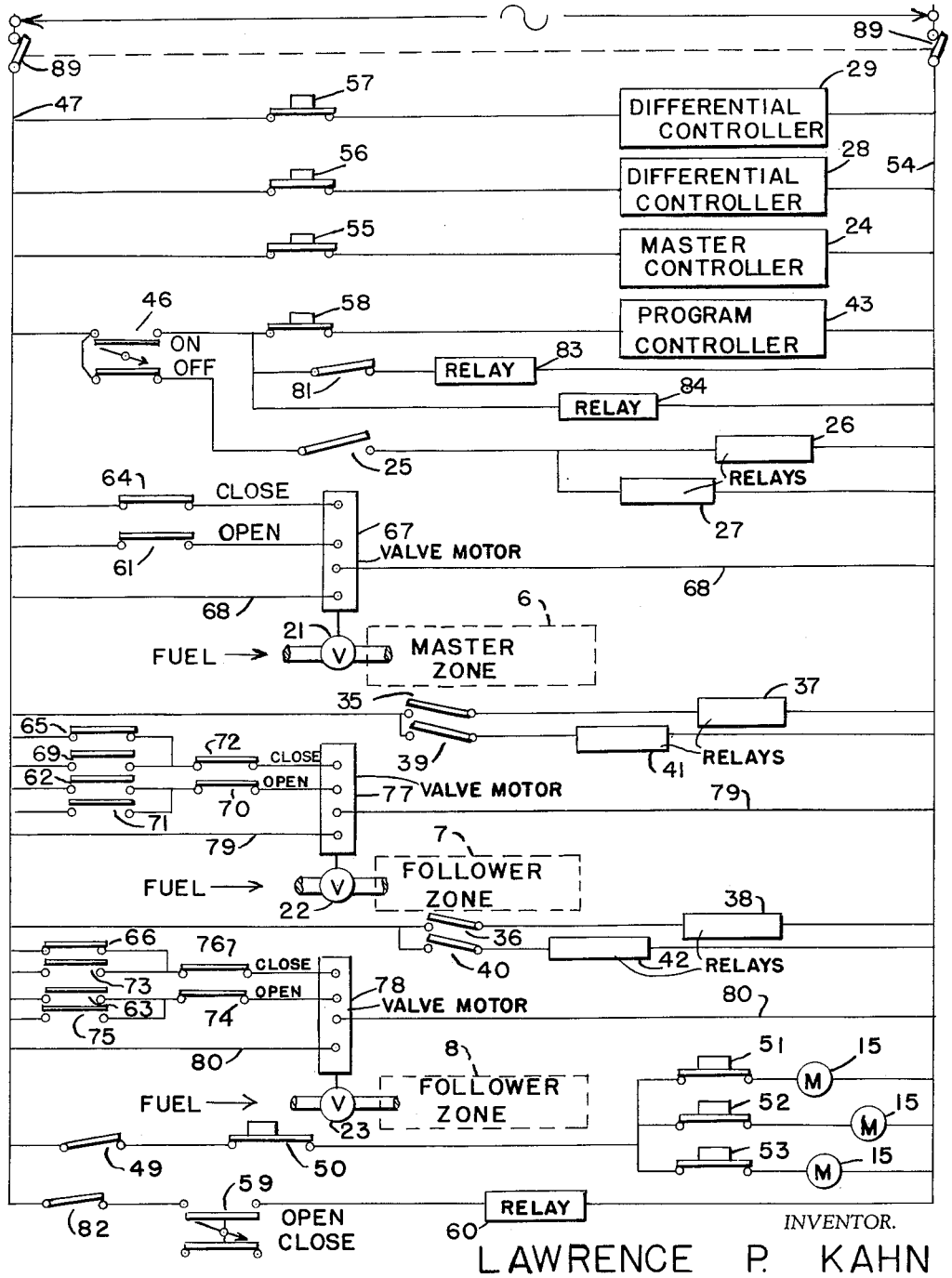

United States Patent Office 2,998,195
Patented Aug. 29, 1961

2,998,195
MULTIPLE ZONE FURNACE CONTROL SYSTEM
Lawrence P. Kahn, Toledo, Ohio, assignor, by mesne assignments, to Midland-Ross Corporation, Cleveland, Ohio, a corporation of Ohio
Filed Feb. 11, 1957, Ser. No. 639,555
14 Claims. (Cl. 236—15)

This invention relates to cycle annealing furnaces for the heat treatment of articles, such as aluminum coils, and more particularly to systems operating in response to thermal conditions for controlling the operation of cycle annealing furnaces.

Cycle annealing furnaces of the type to which the control systems of the invention are especially applicable are those of the batch type having a plurality of heating zones or sections. It is highly desirable to have substantially identical thermal histories for articles which are heat treated in each of the several sections even though there may be more of the articles in one section than there are in another. Prior control systems have not satisfactorily provided such substantially identical thermal histories because they are difficult to operate and/or because they are of high cost.

It is, accordingly, the principal object of this invention to provide an easily operable control system of low cost for cycle annealing furnaces having multiple heating zones by means of which various heat treating cycles can be carried out efficiently and by means of which articles in each of the several zones receive substantially the same heat treatment even though there are different numbers of such articles in the several zones.

Another object of the invention is to provide an improved multiple heating zone batch type furnace for handling a variety of cycle annealing requirements.

Still another object of the invention is to provide an improved automatically operated control system for batch type cycle annealing furnaces having multiple heating zones.

A further object of the invention is to provide a control system which operates according to a pre-established program for batch type cycle annealing furnaces having multiple heating zones which system has means for locking the program out of the system during selected intervals.

More specific objects and advantages are apparent from the following description, in which reference is had to the accompanying drawings illustrating a preferred embodiment of the invention.

In the drawings:

FIGURE I is an end elevational view, one half of which is shown in vertical section to reveal a heating zone, of a furnace embodying the invention;

FIGURE II is a schematic diagram of the pneumatic part of a control system for the furnace illustrating thermocouple-responsive temperature control instruments;

FIGURE III is a schematic electrical wiring diagram of the control system for the furnace; and FIGURE IV is a schematic plan view showing the plurality of work heating zones.

These specific drawings and the specific description that follows merely disclose and illustrate the invention and are not intended to impose limitations upon the claims.

Referring to FIGURE I, the improved batch type cycle annealing furnace includes a generally rectangularly shaped framework or base 1 that is supported on suitably spaced concrete piers 2 which are located in a pit 3 below the level of a floor 4, the top of the framework 1 being about flush with the upper surface of the floor. The framework 1 is covered with shell paneling 5 which forms the vertical walls and the horizontal bottom of the furnace.

The furnace has a master heating zone or section 6 and may have an unlimited number, within reason of course, of identical follower zones or sections 7 and 8 (FIGURES II and III). For example, there are two heating zones 6 and 6' across the end of the furnace as viewed in FIGURE I and there may be three more heating zones behind each of said heating zones for a total of eight identical zones or sections in the furnace, as shown in FIGURE IV. Since all of the heating zones are identical, only one is shown in detail in FIGURE I and only three are shown schematically in FIGURES II and III.

Access to all of the heating zones is made simultaneously by removing a cover 9 by means of a crane, the cover 9 resting on a base support 10 which is located immediately below the level of the floor 4 and compressing a horizontal sealing hose 11 between the cover 9 and the base support 10 when it is in place. The crane also may function, when the cover 9 has been removed, to set trays 12 of work or articles to be heat treated, such as aluminum coils, that are indicated at W in FIGURE I on supports 13 within the master and follower heating zones 6, 7 and 8, respectively. All of the zones are loaded and discharged simultaneously.

The work W is contacted by a rapidly circulating heating medium during the heating and soaking portions of an annealing cycle and by a rapidly circulating cooling medium during the cooling portion of the cycle, the mediums being, for example, air or gas from the furnace itself that is admitted to the furnace through butterfly valves 14, that is rapidly recirculated around the heating zones by means of motor 15 operated fans 16, and that may be vented at any time through a fume damper 17. Three of the fan motors 15 are shown near the bottom of FIGURE III, there being a motor operated fan for each of the zones 6, 7 and 8. The paths of the recirculated mediums are indicated by arrows in FIGURE I, such paths generally following an upward direction around the articles W being heat treated and a downward direction past baffles 18 and around radiant tubes 19 in heater sections 20, which may be directly or indirectly fired as may be required.

It is very desirable to have substantially identical thermal histories for the articles which are heat treated in each of the several sections 6, 7 and 8 even though there may be more of the articles in one section than there are in another. This is accomplished by means of a novel control circuit which features heretofore unknown ease and flexibility of operation and comprises a heretofore unknown combination of low cost equipment.

When it is desired to heat the medium which is recirculated by the fans 16, motor operated gas valves 21, 22 and 23 (FIGURE III) at furnace sections 6, 7 and 8, respectively, are opened to pass fuel to the heaters 20. When it is desired to cool the medium which is recirculated by the fans 16, the butterfly valves 14 are opened permitting cooling medium to be drawn into the furnace sections, such sections being vented during the first heating cycle through the fume damper 17. Alternatively, cooling may be accomplished by putting air through the radiant tubes 19. The temperature cycle in the master heating zone 6 is automatically controlled in the conventional way by an ordinary thermocouple-responsive recording master controller 24 (FIGURES II and III) having a temperature contact 25 (FIGURE III) wired to relays 26 and 27. The temperature cycles in the follower zones 7 and 8, however, are automatically controlled in a unique way by both such master controller 24 and by ordinary thermocouple-responsive differential controllers 28 and 29, controller 28 having a thermocouple 30 located in the master zone 6 and a thermocouple 31 located in the follower zone 7 and controller 29 having a thermocouple 32 located in the master zone 6 and a thermocouple 33 located in the follower zone 8. The master controller 24 has a thermocouple 34 located in the master zone 6. The differential controllers 28 and 29 have high temperature contacts 35 and 36, respectively, wired to relays 37 and 38, respectively, and low temperature contacts 39 and 40, respectively, wired to relays 41 and 42, respectively. The main feature of the invention is in the use of only one master recording controller and the several relatively inexpensive differential controllers in a novel low cost combination instead of using a plurality of the relatively expensive recording controllers one for each section of the furnace as has been done heretofore.

Pneumatically operated program control is provided for the system by an ordinary time-pattern transmitter or program controller 43 which is connected to the master controller 24 by means of a pipe 44 and which is connected to a suitable air supply by means of a pipe 45. The program controller 43 conveniently may be a conventional single cam, time-pattern controller which has a cam that continuously positions the temperature set point index of the master recording controller 24 in accordance with the cam's contour, thereby causing the instrument control function to follow a pre-established cam pattern. The program control may be "locked out" to give a separate control by turning a program control selector switch 46 to its "OFF" position (FIGURE III) which cuts off current flow from a supply lead 47 to the program controller 43. The set point index of the master controller 24 then is controlled by means of a manually operated dead end pressure regulator 48 (FIGURE II) that also is connected to the air supply by pipe 45 and to the master controller by pipe 44. Alternatively, the pressure regulator 48 may be operated by a timer or by an instrument that is responsive to the temperature in the master zone 6. In operation, the operator has only one instrument to set and when on program control all of the heating zones stay in step automatically.

In general, the operation of the control scheme is as follows:

The master controller 24 controls the motor operated gas valve 21 for the master zone 6 in the conventional way. It also has primary control over the motor operated gas valves 22 and 23 for the other heating zones 7 and 8. If the master zone 6 is calling for heat and a follower zone is above the control point, the differential controller for that follower zone takes over and closes the temperature control valve for that zone. In the event that the master zone is not calling for heat and one of the follower zones is below the control point, the differential controller for that zone takes over and opens the temperature control valve for that zone to supply the necessary addition of heat. Such differential controllers are merely indicating instruments so that if a record is desired for all of the zones in the furnace, a multi-point strip chart recording instrument with a thermocouple located in each of the controlled zones may be provided.

Specifically, the operation of the control scheme is as follows:

The cover 9 is placed in position on the base 1 of the furnace. This closes a cover limit switch 49 (FIGURE III). Push buttons 50, 51, 52 and 53 also are closed by finger pressure and current flows from the supply lead 47 through now closed cover limit switch 49, through the four push button contacts to energize the three fan motors 15 and to a lead 54 to the other side of the line, the leads 47 and 54 being connected to a suitable source of alternating current. With the cover 9 in place, all of the motor 15 operated fans 16 may be turned on and off as one by means of the master push button 50 or, with the cover 9 in place and when the master push button contacts are closed, each one of the fans 16 may be turned on and off individually by means of the push buttons 51, 52 and 53. All of the fans 16 stop automatically if the cover 9 is lifted off of the furnace base 1. Normally, during an annealing cycle all of the fans 16 are in operation.

*Heating and soaking cycles*

The master controller 24, the differential controllers 28 and 29 and the program controller 43 are turned on by means of push buttons 55, 56, 57 and 58, respectively. The program control then is "locked out" by turning the program control selector switch 46 to its "OFF" position which cuts off current flow to the program controller 43 and a ventilate selector switch 59 is turned to its "CLOSE" position which cuts off current flow to an electro-pneumatic relay 60 having a function hereinafter described. The set point index or the control point of the master controller 24 first is set at a temperature well above the desired annealing temperature for the sake of efficiency until the temperature of the articles being heat treated approaches the annealing temperature and then the control point is decreased to a value sufficient to maintain the articles at their annealing temperature for the soaking cycle. The desired temepratures are controlled automatically.

At the beginning of the heating cycle, all of the heating zones 6, 7 and 8 are at temperatures below the control point. Therefore, the temperature contact point 25 in the master controller 24 is closed and current flows through the lower contacts of the program control selector switch 46 and closed contact 25 to energize relays 26 and 27. Energization of relay 26 causes it to close its normally open contacts 61, 62 and 63. Energization of relay 27 causes it to open its normally closed contacts 64, 65 and 66. The circuits through contacts 61 and 64 are the ordinary starter circuits of a conventional 180° travel valve motor 67 and the circuits through a lead 68 are the usual running circuits for the valve motor 67. Instead of using on and off firing, the master zone 6 may use throttling control or time-proportioning control, e.g., off $x$ seconds and on $y$ seconds. The closing of contact 61 and the opening of contact 64 causes the valve motor 67 to move 180° and open the gas valve 21 at the master zone 6.

The high temperature contact 35 and the low temperature contact 39 in differential controller 28 are set so that when the temperature in follower zone 7 is, for example, five degrees above the temperature in the master zone 6 the high temperature contact 35 will close and when the temperature in follower zone 7 is, for example, five degrees below the temperature in the master zone 6 the low temperature contact 39 will close, i.e., both contacts 35 and 39 are open when the temperature in follower zone 7 is in a range which is between five degrss below and five degrees above the temperature in the master zone. Such range, of course, may be varied.

It is preferred to have all of the heaters 20 go on and off together except when one zone is too hot or too cold. Therefore, at the start of the heating cycle, when the gas valve 21 at the master zone 6 is opened, the gas valves 22 and 23 at the follower zones 7 and 8, respectively, are opened simultaneously. This is accomplished automatically, since the high temperature contacts 35 and 36 and the low temperature contacts 39 and 40 remain open at the beginning of a heating cycle when the temperatures in all of the zones are about the same. Open contacts 35, 39, 36 and 40 prevent current flow to relays 37, 41, 38 and 42, respectively. Deenergization of relay 37 causes its normally open contact 69 to open and its normally closed contact 70 to close; deenergization of relay 41 causes its normally open contact 71 to open and its normally closed contact 72 to close; deenergization of relay 38 causes its normally open contact 73 to open and its normally closed contact 74 to close; deenergization of relay 42 causes its normally open contact 75 to open and its normally closed contact 76 to close. Current then flows through now closed contact 62 of relay 26 and through now closed contact 70 of relay 37 to a valve motor 77 which moves 180° and opens the gas valve 22 at follower zone 7 and current also flows through now closed contact 63 of relay 26 and through now closed contact 74 of relay 38 to a valve motor 78 which moves 180° and opens the gas valve 23 at follower zone 8. The circuits through relay contacts 70 and 72 and through relay contacts 74 and 76 are the ordinary starter circuits of conventional valve motors 77 and 78, respectively, and the circuits through leads 79 and 80 are the usual running circuits for valve motors 77 and 78, respectively. Thus, at the beginning of the heating cycle all of the heaters 20 go on together. Alternatively, the temperature contacts in the differential controllers may be set so that at the beginning of the heating cycle the motor operated gas valves at the follower zones will be opened when the follower zones are, for example, five degrees colder than the master zone. However, it is preferred that all of the heaters go on and off together except when one zone is too hot or too cold.

It also is preferred that the master zone 6 be as heavily loaded with articles to be heat treated as any other zone so that the other zones can follow easily. The master zone 6 is designed to give suitable time-temperature cycles and the automatic following of the other zones produces substantially identical thermal histories for articles which are heat treated in each of the several sections even though there may be more of the articles in one section than there are in another.

When the temperature of the master zone 6 gets above the control point, the temperature contact point 25 in the master controller 24 opens. Opening of contact 25 causes relays 26 and 27 to be deenergized. Deenergization of relay 26 causes normally open relay contacts 61, 62 and 63 to open. Deenergization of relay 27 causes normally closed relay contacts 64, 65 and 66 to close. The closing of contact 64 and the opening of contact 61 causes the valve motor 67 to move 180° and close the gas valve 21 at the master zone 6. Hence, the opening and the closing of temperature contact 25 in the master controller 24 controls the closing and the opening, respectively, of the motor operated gas valve 21 and causes the temperature of the master zone 6 to cycle back and forth in a narrow range around the control point.

If either one of the follower zones is at the master zone temperature when the temperature of the master zone 6 gets above the control point, for example follower zone 7, the follower zone high and low contacts 35 and 39, respectively, remain open and relays 37 and 41 remain deenergized. However, the opening of contact 62 caused by the deenergization of relay 26 and the closing of contact 65 caused by the deenergization of relay 27 causes the valve motor 77 to move 180° and close the gas valve 22 at follower zone 7. Similarly, valve motor 78 closes gas valve 23 at follower zone 8 if follower zone 8 is at the master zone temperature when the temperature of the master zone gets above the control point. Thus, the temperatures of the follower zones stay in step with the temperature of the master zone.

If either one of the follower zones gets above the master zone temperature by an amount beyond the set range during any part of the annealing cycle, for example follower zone 7, follower zone high contact 35 closes and relay 37 is energized. This closes normally open relay contact 69 and opens normally closed relay contact 70 and current flows through now closed relay contacts 69 and 72 to cause valve motor 77 to run to its closed position. Similarly, valve motor 78 runs to its closed position if follower zone 8 gets above the master zone temperature by an amount beyond the set range.

If either one of the follower zones gets below the master zone temperature by an amount beyond the set range during any part of the annealing cycle, for example follower zone 7, follower zone low contact 39 closes and relay 41 is energized. This closes normally open relay contact 71 and opens normally closed relay contact 72 and current flows through now closed relay contacts 71 and 70 to cause valve motor 77 to run to its open position. Similarly, valve motor 78 runs to its open position if follower zone 8 gets below the master zone temperature by an amount beyond the set range.

To summarize the heating cycle, the temperature in each one of the follower zones is controlled by two thermocouples, one in the master zone and one in the follower zone. It is to be understood that there may be an unlimited number of follower zones within reason. The master controller 24 controls the motor operated gas valve 21 for the master zone 6 in the conventional way. The temperatures in the master and follower zone are compared and if there is a difference beyond a set range the valve motor for the follower zone is operated. While the temperature difference is within the set range, the master controller controls the valve motor for the follower zone. When the temperature difference gets beyond the set range, the circuit from the master controller is interrupted and the differential controller takes over to bring the temperature of the follower zone into step with that of the master zone—otherwise the motor operated gas valves all go on and off together. The temperature set point index of the master controller 24 either automatically follows a pre-established pattern, e.g., a cam pattern, when the program control selector switch 46 is turned to its "ON" position or the temperature set point index is set by means of the pressure regulator 48 after the program control selector switch 46 is turned to its "OFF" position.

*Cooling cycle*

After the articles being annealed have been soaked at the correct temperature for the right length of time, the fume damper 17 (FIGURE I) is opened to initiate a cooling cycle. Opening of the damper 17 causes fume damper limit switches 81 and 82 to close. The program control selector switch 46 is turned to its "ON" position. Current then flows through the upper contacts of switch 46 to energize electro-pneumatic relays 83 and 84 (see also FIGURE II). Relay 83 connects the output of the program controller 43 to the input of the master controller 24 by means of pipe 44 and relay 84 connects the output of the master controller 24 to cooling damper pneumatic operators 85 which operate the butterfly valves 14. Eight cooling damper pneumatic operators 85 are shown since a batch furnace of convenient size may have eight heating zones or sections and, hence, eight butterfly valves 14. Ordinary pneumatic relays 86 are located between the electropneumatic relay 84 and each set of four damper operators 85. The master controller 24 now controls all of the damper operators 85.

If a follower zone should fall below master zone temperature, for example follower zone 7, follower zone low contact 39 closes to energize relay 41. Energization of relay 41, as hereinbefore described, causes motor operated valve 22 at follower zone 7 to go to its open position to add heat. Similarly, if follower zone 8 should fall below master zone temperature, follower zone low contact 40 closes to energize relay 42 and motor operated valve 23 at follower zone 8 moves to its open position to add heat. During the cooling cycle, the follower zones can only add heat to stay at master zone temperature, i.e., they cannot add cooling.

*Ventilating*

The fume damper 17 is kept open which keeps the fume damper limit switches 81 and 82 closed, the program control selector switch 46 is turned to its "OFF" position, and the ventilate selector switch 59 is turned to its "OPEN" position. Switch 46 being in "OFF" position breaks the circuit to electro-pneumatic relays 83 and 84 and switch 59 being in "OPEN" position completes a circuit through the upper contacts of switch 59 to energize electro-pneumatic relay 60 which sends a pre-set air signal through pipe 87 to the cooling damper operators 85 to run the dampers or butterfly valves 14 open. The air pressure in the various pipes of the pneumatic system is regulated by manually operated air-filter-dripwell-regulators 88. Safety fused disconnect switch 89 (FIGURE III) may be used to interrupt the electrical circuit at any time.

It will, of course, be understood that various details of construction and design may be varied over a wide range without departing from the principles of the invention, and it is therefore not the purpose to limit the patent granted hereon otherwise than necessitated by the scope of the appended claims.

I claim:

1. A furnace and control system therefor comprising, in combination, a master heating section, a follower heating section, means for heating the sections, first control means that is responsive to the temperature of the master heating section and that has complete control over the heating means for the master heating section for controlling the temperature of the master heating section within a predetermined range and that has primary control over the heating means for the follower heating section for controlling the temperature of the follower heating section while the temperature of the follower heating section is within a predetermined range of the temperature of the master heating section, and second control means that is responsive to the difference in temperatures of the sections and that has secondary control over the heating means for the follower heating section for controlling the temperature of the follower heating section if the temperature of the follower heating section moves out of said predetermined range of the temperature of the master heating section to bring the temperature of the follower heating section back into said latter range, whereby the temperature of the follower heating section follows closely the temperature of the master heating section.

2. A furnace and control system therefor according to claim 1 having a program controller operatively connected to the first control means for changing the predetermined temperature range of the master heating section according to a pre-established pattern.

3. A furnace and control system therefor according to claim 2 wherein the program controller is pneumatically connected to the first control means and additional means are provided to lock the program controller out of the system during selected intervals.

4. A furnace and control system therefor comprising, in combination, a master heating section, a follower heating section, means for heating the sections, means for cooling the sections, first control means that is responsive to the temperature of the master heating section and that has complete control over the heating means for the master heating section and over the means for cooling the sections and that has primary control over the heating means for the follower heating section, said first control means functioning to control the temperature of the master heating section within a predetermined range and to control the temperature of the follower heating section while the temperature of the follower heating section is within a predetermined range of the temperature of the master heating section, and second control means that is responsive to the difference in temperatures of the sections and that has secondary control over the heating means for the follower heating section for controlling the temperature of the follower heating section if the temperature of the follower heating section moves out of said predetermined range of the temperature of the master heating section to bring the temperature of the follower heating section back into said latter range, whereby the temperature of the follower heating section follows closely the temperature of the master heating section.

5. A furnace and control system therefor according to claim 4 having a program controller operatively connected to the first control means for changing the predetermined temperature range of the master heating section according to a pre-established pattern.

6. A furnace and control system therefor according to claim 5 wherein the program controller is pneumatically connected to the first control means and additional means are provided to lock the program controller out of the system during selected intervals.

7. A system for controlling the operation of a batch type annealing furnace having a master heating section and at least one follower heating section comprising, in combination, control means responsive to the temperature of the master heating section for controlling the temperature of the master heating section within a predetermined range, a pair of thermocouples, one thermocouple being located in one of the sections and one thermocouple being located in the other one of the sections, and a differential controller that is connected to the thermocouples and that compares the temperatures of the sections, said control means functioning additionally to control the temperature of the follower heating section while the temperature of the follower heating section is within a predetermined range of the temperature of the master heating section and said differential controller functioning to control the temperature of the follower heating section if the temperature of the follower heating section moves out of said latter predetermined range to bring the temperature of the follower heating section back into said latter predetermined range.

8. A system for controlling the operation of a batch type annealing furnace according to claim 7 having a program controller operatively connected to the control means for changing the predetermined temperature range of the master heating section according to a pre-established pattern.

9. A system for controlling the operation of a batch type annealing furnace according to claim 8 wherein the program controller is pneumatically connected to the control means and additional means are provided to lock the program controller out of the system during selected intervals.

10. A furnace and control system therefor comprising, in combination, a first heating zone, a second heating zone, means for heating the first zone including a first fuel valve, means for heating the second zone including a second fuel valve, first control means responsive to the temperature of the first zone for completely controlling the first valve and for controlling the second valve while the temperature of the second zone is within a predetermined range of the temperature of the first zone, and second control means that is responsive to the difference in temperatures of the zones and that interrupts the control exercised by the first control means over the second valve if the temperature of the second zone moves out of said predetermined range of the temperature of the first zone to exercise its own control over the second valve to bring the temperature of the second zone back into said predetermined range of the temperature of the first zone, whereby the temperature of the first zone is held in a predetermined range and the temperature of the second zone follows closely the temperature of the first zone.

11. A furnace and control system therefor according to claim 10 having a program controller operatively connected to the first control means for changing the predetermined temperature range of the first zone according to a preestablished pattern.

12. A furnace and control system therefor according to claim 11 wherein the program controller is pneumatically connected to the first control means and additional means are provided to lock the program controller out of the system during selected intervals.

13. A furnace and control system therefor comprising, in combination, a first heating zone, a second heating zone, means for heating the first zone including a first fuel valve, means for heating the second zone including a second fuel valve, means for cooling the zones, a master controller that is responsive to the temperature of the first zone and that is operatively connected to the valves and to the cooling means for controlling the temperatures of the zones within a predetermined range, and a differential controller that is responsive to the difference in the temperatures of the zones and that is operatively connected to the second valve and that interrupts the control exercised by the first control means over the second valve if the temperature of the second zone moves a predetermined amount above or below the temperature of the first zone to exercise its own control over the second valve and bring the temperature of the second zone back into said predetermined range.

14. A furnace and control system therefor comprising, in combination, a first heating zone, a second heating zone, means for heating the first zone including a first fuel valve and a motor for operating the first valve, means for heating the second zone including a second fuel valve and a motor for operating the second valve, a first controller responsive to the temperature of the first zone, an electrical circuit which connects the first controller to the motors whereby the first controller controls the temperatures of the zones within a predetermined range by causing the valves to open and shut, a second controller that is responsive to the difference in temperatures of the zones and that also is connected in the electrical circuit, and means in the electrical circuit which are controlled by the second controller for interrupting the connection of the first controller with the motor for the second fuel valve and for connecting the second controller to such motor if the temperature of the second zone moves a predetermined amount above or below the temperature of the first zone, whereby control over the second valve is transferred from the first controller to the second controller and whereby the second controller controls the motor for the second valve temporarily until the temperature of the second zone moves back into said predetermined range.

References Cited in the file of this patent

UNITED STATES PATENTS

| | | |
|---|---|---|
| 1,603,729 | Wilhjelm | Oct. 19, 1926 |
| 2,202,485 | Fitch | May 28, 1940 |
| 2,285,288 | Krogh | June 2, 1942 |
| 2,376,573 | Cockley | May 22, 1945 |
| 2,394,061 | Horstkotte | Feb. 5, 1946 |
| 2,505,038 | Gilley | Apr. 25, 1950 |